United States Patent
Zielinska et al.

(10) Patent No.: US 10,007,170 B2
(45) Date of Patent: Jun. 26, 2018

(54) MONOLITHIC FREQUENCY CONVERTER

(71) Applicants: Fundacio Institut de Ciencies Fotoniques, Barcelona (ES); Institucio Catalana de Recerca I Estudios Avancats, Barcelona (ES)

(72) Inventors: Joanna A. Zielinska, Barcelona (ES); Morgan W. Mitchell, Barcelona (ES)

(73) Assignees: FUNDACIO INSTITUT DE CIENCIES FOTONIQUES, Barcelona (ES); INSTITUCIO CATALANA DE RECERCA I ESTUDIOS AVANCATS, Barcelona (ES)

( * ) Notice: Subject to any disclaimer, the term of this patent is extended or adjusted under 35 U.S.C. 154(b) by 0 days. days.

(21) Appl. No.: 15/711,453

(22) Filed: Sep. 21, 2017

(65) Prior Publication Data

US 2018/0081256 A1 Mar. 22, 2018

(30) Foreign Application Priority Data

Sep. 21, 2016 (EP) ..................... 16382440

(51) Int. Cl.
*G02F 1/39* (2006.01)
*G02F 1/377* (2006.01)

(52) U.S. Cl.
CPC .............. *G02F 1/39* (2013.01); *G02F 1/3775* (2013.01); *G02F 2001/392* (2013.01)

(58) Field of Classification Search
CPC ........ G02F 1/3544; G02F 1/3775; G02F 1/39; G02F 2001/395; H01S 3/1028; H01S 5/0607
See application file for complete search history.

(56) References Cited

U.S. PATENT DOCUMENTS

| | | | | | |
|---|---|---|---|---|---|
| 5,353,292 | A | * | 10/1994 | Motegi | ..................... G02F 1/37 359/326 |
| 5,546,220 | A | * | 8/1996 | Endo | ...................... G02F 1/377 359/328 |
| 5,867,303 | A | * | 2/1999 | Mohatt | ..................... G02F 1/37 359/328 |
| 5,898,718 | A | * | 4/1999 | Mohatt | .................. G02F 1/377 359/326 |

(Continued)

FOREIGN PATENT DOCUMENTS

WO 2016-034416 3/2016

OTHER PUBLICATIONS

Kozlovsky et al., Efficient Second Harmonic Generation of a Diode-Laser-Pumped CW Nd: YAG Laser Using Monilithic MgO: LiNbO3 External Resonant Cavities, IEEE Journal of Quantum Electronics, vol. 24, No. 6, Jun. 1988.

(Continued)

*Primary Examiner* — Daniel Petkovsek
(74) *Attorney, Agent, or Firm* — Baker & Hostetler LLP

(57) ABSTRACT

Tunable monolithic cavity-based frequency converter pumped by a single-frequency laser where cavity resonance(s) are achieved by independently changing the temperatures of different sections of the crystal, including the periodically poled section and one or more adjacent, non-poled regions. Having independent control of the phase matching temperature and the cavity resonance for a down-converted beam increases the efficiency.

6 Claims, 3 Drawing Sheets

(56) References Cited

U.S. PATENT DOCUMENTS

| | | | |
|---|---|---|---|
| 7,999,998 B2* | 8/2011 | Morikawa | G02F 1/3775 |
| | | | 359/328 |
| 8,173,982 B2* | 5/2012 | Edamatsu | B82Y 10/00 |
| | | | 250/493.1 |
| 8,259,385 B2* | 9/2012 | Hempstead | G02B 27/48 |
| | | | 359/326 |
| 8,508,841 B2* | 8/2013 | Chou | G02F 1/3501 |
| | | | 359/328 |
| 2005/0008046 A1 | 1/2005 | Vodopyanov et al. | |
| 2011/0116519 A1* | 5/2011 | Peng | G02F 1/39 |
| | | | 372/21 |
| 2012/0182535 A1 | 7/2012 | Okazaki et al. | |

OTHER PUBLICATIONS

Yonezawa et al., Generation of Squeezed Light with A Monolithic Optical Parametric Oscillator: Simultaneous Achievement of Phase Matching and Cavity Resonance by Temperature Control, Optics Express, Sep. 13, 2010, vol. 18. No. 19.

Stefszky et al., An Investigation of Doubly-Resonant Optical Parametric Oscillators and Nonlinear Crystals for Squeezing, Journal of Physics B, Dec. 16, 2010, p. 9.

* cited by examiner 3-section $T_L$ $T_C$ $T_R$ 2-section $T_C$ $T_S$

MONOLITHIC FREQUENCY CONVERTER

BACKGROUND OF THE INVENTION

Field of the Invention

The present invention relates to monolithic nonlinear frequency converters based on second order nonlinear materials used for three wave mixing processes in an optical cavity. In particular, the invention is a tunable monolithic cavity-based frequency converter pumped by a single-frequency laser where cavity resonance(s) are achieved by independently changing the temperatures of different sections of the crystal, including the periodically poled section and one or more adjacent, non-poled regions.

Description of Related Art

Frequency converters based on second order nonlinear materials can use a cavity consisting of mirrors aligned around a nonlinear material so that the beam(s) involved in three wave mixing processes are resonant. In monolithic nonlinear devices on the contrary the active material is not surrounded by separate mirrors that have to be aligned around it to form a cavity, but rather the faces of the active material itself are polished and coated so that they form the mirrors. Monolithic frequency converters are more robust, stable and have less intra-cavity losses than frequency converters with mirrors.

If a cavity-enhanced frequency converter has a single resonance, it means that only one beam is resonant. The remaining beams exit the cavity without making multiple passes though the crystal. If the same source is doubly resonant, it means that two beams are resonant. In case of nondegenerate processes, the source might be triply-resonant. Multiple resonances increase efficiency of the frequency conversion, since the optical intensity inside the cavity is enhanced. A degenerate three wave mixing process means that there are only two (not three) wavelengths involved. Second harmonic generation and degenerate down-conversion in type-I crystals are degenerate processes, so they can be at most doubly resonant. Type I refers to three wave mixing process where the polarizations of all three beams are the same, whereas type II means that one of the frequencies involved is orthogonal to the two remaining ones, rendering the degenerate downconversion process possible only with the type I crystals.

In order to make a second-order-nonlinearity-based device work for a particular set of wavelengths, a phase matching condition must be fulfilled. By phase matching we understand a condition resulting from the principle of conservation of momentum, fulfilment of which is necessary for the three wave mixing to occur. Because of dispersion, different frequency light beams move through the nonlinear medium with different phase velocities, and this creates a momentum ("phase") mismatch between nonlinearly interacting beams as they pass through the crystal. If not corrected, this phase mismatch leads to a very small net conversion efficiency. A normal technique to ensure the fulfilment of the phase matching condition is periodic poling, by which it is understood that the crystal is fabricated so that the condition is satisfied when the crystal is maintained is a determined phase matching temperature.

Apart from phase-matching, two other kinds of matching conditions must also be satisfied in order to achieve efficient nonlinear conversion in a cavity-based frequency converter. First, resonance conditions, one for each resonated wavelength, must be satisfied, in order to obtain a resonant power build-up. Second, Fabry-Perot cavity based devices with multiple resonances have an additional condition, resulting from the fact that the light passes through the nonlinear medium twice every cavity roundtrip, and the relative phase between the light created in the two consecutive passes through the nonlinear medium must be controlled in order that constructive interference is maintained. By Fabry-Perot cavity we mean a cavity made of two parallel mirrors, for which the light travels twice the same path each roundtrip. This relative phase condition applies only when the pump beam and at least one of the converted beams is resonant in the Fabry-Perot cavity.

For example, in order to obtain a second harmonic generation out of the doubly-resonant linear cavity one needs to control a phase matching condition, two resonance conditions and relative phase conditions which adds up to four degrees of freedom that must be controlled.

There are several methods of tuning the cavities so that the resonance and relative phase conditions are fulfilled, for example wavelength. Adjusting the laser frequency until it coincides with a cavity resonance frequency. This strategy can be employed when there is no precise requirement of the frequency of the generated light and it can be changed within the cavity free spectral range. Otherwise the cavity resonance must be tuned to the laser frequency using one of the methods mentioned below.

displacing one of the external cavity mirrors by means of an actuator. Moving the mirror so that the cavity length can be controlled.

thermooptical effect. Changing the temperature of an optical element within a cavity changes its refractive index (by different amount for each wavelength involved), modifying the optical path length through the element.

elastooptical effect. Similar to temperature, a pressure applied to an optical element within a cavity also changes the refractive index.

electrooptical effect. The electric field can also change the refractive index.

To our knowledge, there are no monolithic frequency converters reported in the literature that offer independent control of the phase matching and the cavity resonance(s), as in the invention described here. For example, a monolithic frequency converter (an optical parametric oscillator) described in "Generation of squeezed light with a monolithic optical parametric oscillator (OPO): Simultaneous achievement of phase matching and cavity resonance by temperature control," Opt. Express 18, 20143-20150 (2010), by Hidehiro Yonezawa, Koyo Nagashima, and Akira Furusawa, requires two conditions to work efficiently, a phase matching and one cavity resonance condition, similarly to a singly resonant second harmonic generation device. In the OPO presented in the Yonezawa et al article, the single resonance condition is satisfied at the cost of the phase matching, since only one degree of freedom is used, namely the temperature of the entire crystal. This presents however the drawback that it is not possible to have independent control of the phase matching temperature and the cavity resonance for a down-converted beam. Therefore, a resonance is achieved at the cost of compromising the phase matching, and thus decreasing the efficiency. Furthermore, in this scenario, adding a resonance of another frequency involved in the nonlinear interaction is impossible.

SUMMARY OF THE INVENTION

The present invention provides a monolithic frequency converter with independent control of phase matching and cavity resonance(s). Various sections of the crystal in the invention have different purposes and different, independently-controlled temperatures. This allows control of the resonance(s) of the cavity independently of the phase matching condition and has thus the advantage that efficiency is enhanced by both second harmonic and fundamental resonances. The crystal is divided into an active section located around the focus of the cavity mode where the energy density is the highest and the three wave mixing process occurs. This section is maintained in the phase matching temperature. In addition to this active region, there are one (in case of a 2-section geometry) or two (in the case of a 3-section geometry) side sections that have the purpose of cavity resonance control, which is accomplished by maintaining the side section(s) at a temperature that is different than the phase matching temperature. In case of the 3-section geometry where we have two side sections, their temperatures serve as two degrees of freedom allowing control of two cavity resonance conditions. In a scenario where only one degree of freedom of cavity control via temperature is necessary (for example a singly resonant cavity case), a 3-section cavity could be simplified to a 2-section version, as in FIG. 2. A person skilled in the art would recognize that this affects only number of degrees of freedom, not the performance of the tuning method which is identical as in the 3-section cavity.

BRIEF DESCRIPTION OF THE DRAWINGS

To complete the description and provide for better understanding of the invention, a set of drawings is provided. Said drawings illustrate a preferred embodiment of the invention, which should not be interpreted as restricting the scope of the invention, but only as an example of how the invention can be carried out.

DESCRIPTION OF THE PREFERRED EMBODIMENTS

Figure 1:
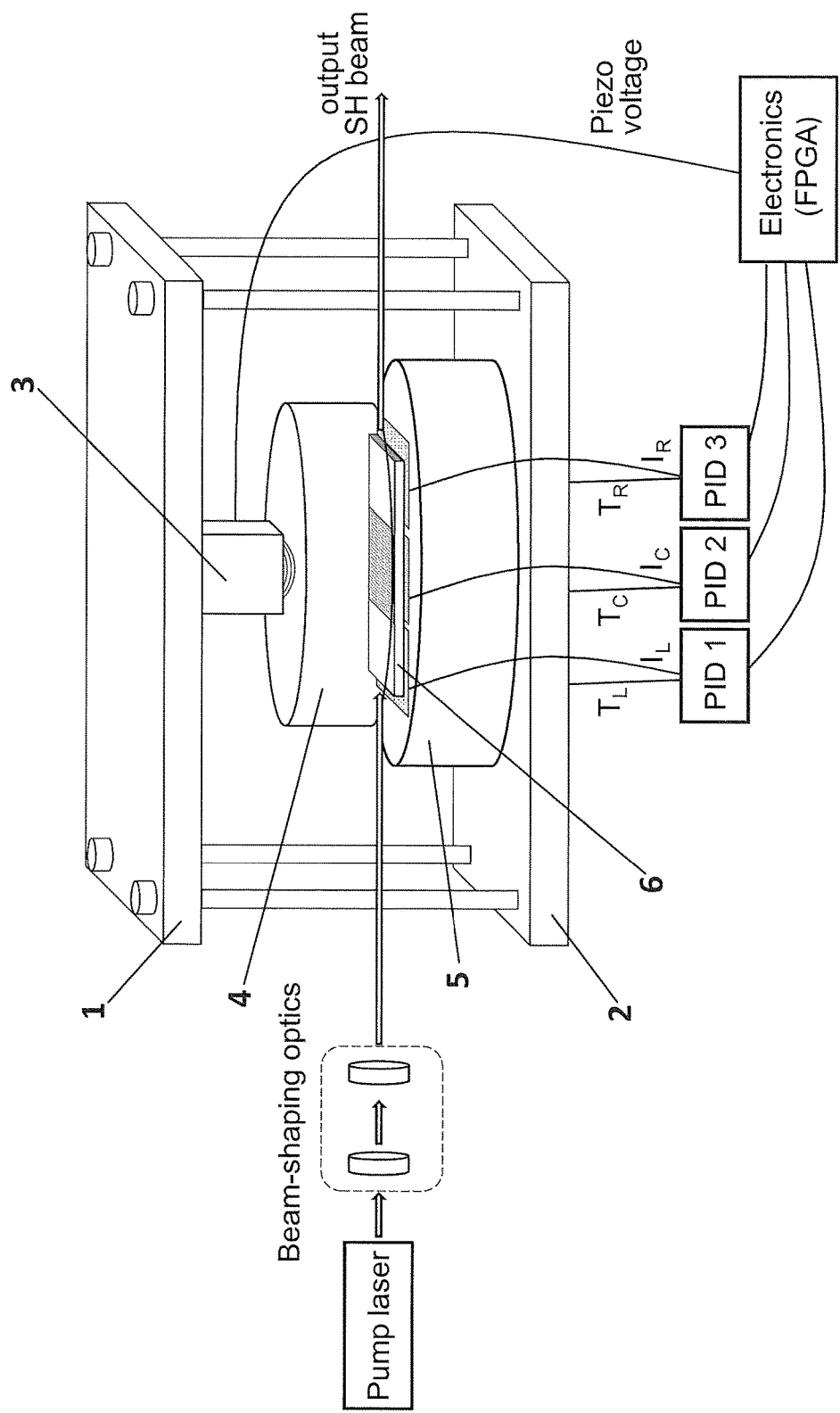
FIG. 1 shows a first embodiment of the monolithic frequency converter of the invention.
Figure 2:
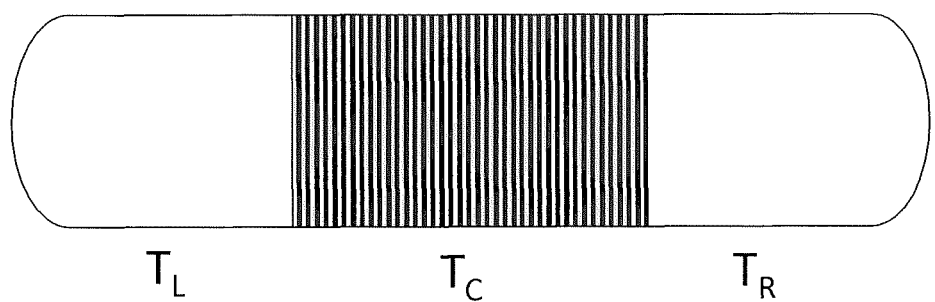
FIG. 2 shows details of the crystal applied to the invention. In a particular 3-section embodiment, both faces of the same are spherically polished, whereas in 2-section geometry embodiments one surface is spherically polished while the second surface of the crystal can have planar as well as spherical polishing. Active sections of the crystals are marked by stripes, and are kept in phase matching temperature $T_C$. Tuning sections (grey) are maintained at their respective temperatures $T_L$ and $T_R$ in the 3-section geometry, and $T_S$ in the 2-section geometry in order to ensure cavity resonance(s).
Figure 2:
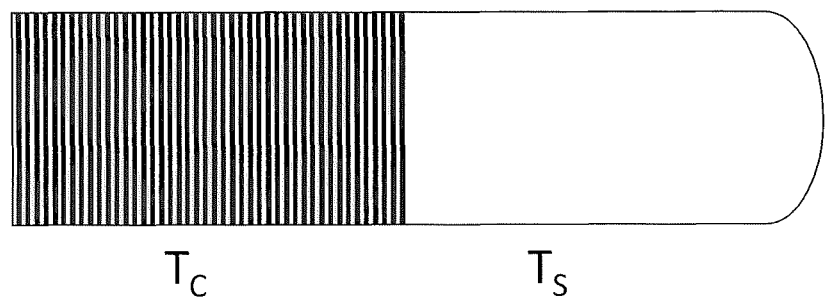
Figure 3:
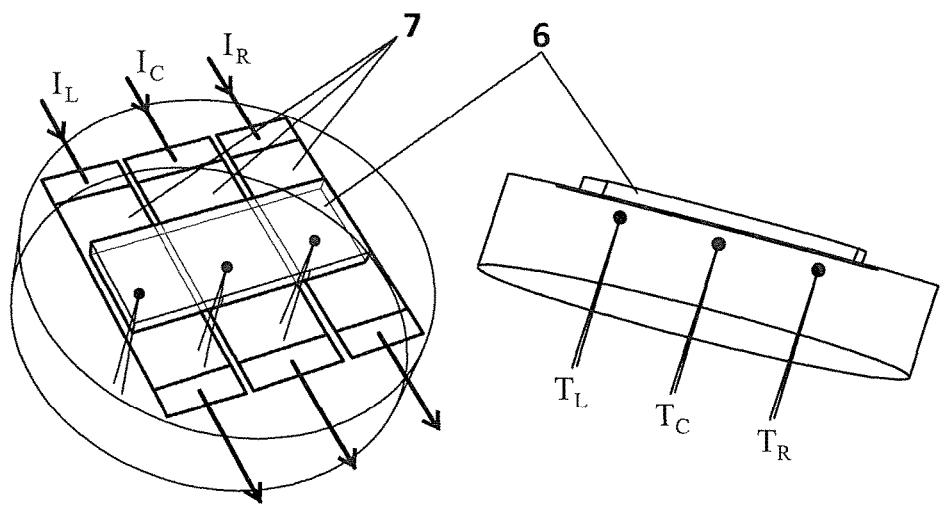
FIG. 3 shows a detail of the crystal and the resistive heaters applied to it.

With reference to FIG. 1, the monolithic frequency converter of the invention in a first embodiment is a doubly resonant second harmonic generation device that has both faces of the crystal polished and coated so that a stable cavity is formed. The coating on the input (left) side of the crystal is partially transmissive for the fundamental and totally reflective for the second harmonic (SH) and the output side is partially transmissive for the SH and totally reflective for the fundamental beam. The elements of the particular embodiment depicted in FIG. 1 are marked as follows:

1. Upper support of a piezoelectric actuator
2. Lower support of the piezoelectric actuator, rigidly connected to the upper support
3. Piezoelectric actuator, preferably with a spherical end piece that ensures uniform distribution of pressure applied to the surface of the crystal, in order to reduce the possibility of breaking the same.
4. Upper polished glass plate, for the purpose of applying a uniform pressure to the entire upper surface of the crystal
5. Lower polished glass plate with resistive heaters and temperature sensors, shown in detail in FIG. 3.
6. Monolithic second harmonic generating crystal, with faces spherically polished and coated in the case of the 3-section embodiment. In the 2-section embodiments, one of the crystal faces can be planar.
7. Thin layer resistors made of indium tin oxide (ITO) deposited on the lower glass plate $I_L$, $I_R$ and $I_C$ denominate currents flowing through the left, right and centre ITO heaters respectively and $T_L$, $T_R$ and $T_C$ are the temperature sensor readings corresponding to the heaters. A person skilled in the art will recognize that the heaters can be made of a variety of materials, not necessarily ITO.

The doubly resonant second harmonic generator based on a Fabry-Perot cavity as the first embodiment of the invention needs the following resonance conditions to maximize its emission for a given wavelength:

Red resonance

Blue resonance

Relative phase between the second harmonic fields created in consecutive passes through the active region of the crystal. This phase must be maintained for constructive interference.

Additionally, in order to maintain phase-matching, the active section of the crystal must be kept at the phase matching temperature $T_C$.

In this embodiment, all three resonance conditions are controlled for an arbitrary wavelength. This is possible because the thermo-optical coefficient (derivative of the refractive index with respect to the temperature) has different values for the fundamental and second harmonic, so that $T_L$ and $T_R$, the temperatures of the side sections of the crystal, serve as two independent degrees of freedom (DOF) that can tune the cavity so as to satisfy two out of the three resonance conditions for any arbitrary wavelength.

The third resonance condition is met using the elastooptic effect, by stressing the entire crystal by means of an actuator, for example a piezoelectric actuator. These controls are compatible with maintaining the phase matching condition using $T_C$, the temperature of the active section.

Figure 4:
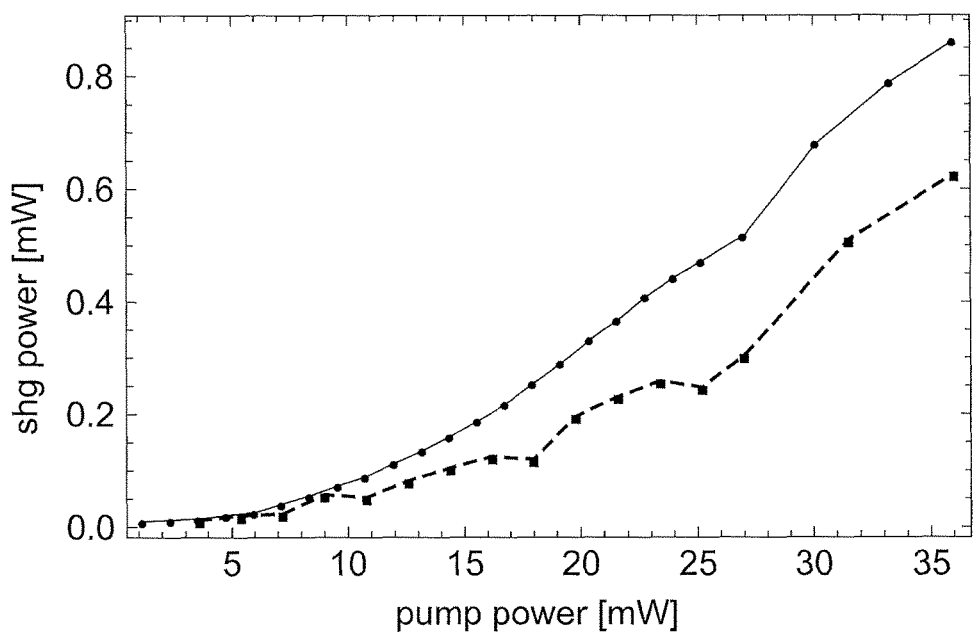
FIG. 4 is a graph comparing the second harmonic generation efficiency when optimizing all the degrees of freedom independently, as in the invention, or using the temperature of the entire crystal as a degree of freedom to control resonance, with a resulting imperfect phase matching control, as in the prior art.

FIG. 4, represents the dependence of the generated SH power on the fundamental power with all three degrees of freedom and phase matching optimized. Since this is a doubly resonant cavity, for it to work efficiently, one must maintain fundamental resonance, second harmonic resonance, and relative phase between second harmonic generated in two consecutive passes through the active region (in addition to the phase matching). This is achieved by using the two side section temperatures and the piezo voltage for the three resonance conditions while keeping the active region at the phase matching temperature. The dashed curve shows the same relationship of SH power to input fundamental power, with optimization of only the piezo voltage and the temperature of the entire crystal, thereby trying to achieve resonances at the cost of phase matching. This comparison shows that using full-crystal temperature as a degree of freedom to achieve cavity resonance(s) yields less conversion efficiency than does employing multiple independent temperature controls of the phase matching temperature.

The invention, a monolithic resonant frequency converter, can also be used as a degenerate double resonance OPO with the same tuning method. An analogous tuning strategy can be employed in non-degenerate OPO scenarios as well, in order to maintain signal and idler resonance. Apart from that, single resonance monolithic devices (second harmonic generators and down-converters) can benefit from elements of the tuning method that relies on having different sections of the crystal at different temperatures, being able to independently control the single cavity resonance and phase matching condition.

The following table illustrates the driving methods for both 3-section and 2-section embodiments of the invention. The coatings on the faces of the crystal decide whether the device works with single or double resonance. Abbreviations used in the table: SHG—second harmonic generation, PDC—parametric down-conversion, SFG—sum frequency generation. "Elastooptic effect" refers to fulfilling one of the cavity degrees of freedom by applying pressure to the crystal, whereas "wavelength tuning" means that the wavelength of one of the beams involved in the nonlinear interaction is adjusted to a cavity resonance. The column describing advantages over prior art points out which devices would benefit from increased efficiency applying the independent control of temperatures of sections of the crystal, and also, the cases in which the advantage is the possibility of tuning of the emission wavelength within the cavity free spectral range.

On the other hand, the invention is obviously not limited to the specific embodiment(s) described herein, but also encompasses any variations that may be considered by any person skilled in the art (for example, as regards the choice of materials, dimensions, components, configuration, etc.) to be within the general scope of the invention as defined in the claims.

The invention claimed is:

1. A monolithic resonator based apparatus comprising:
   a resonator made of a single bulk non-linear crystal with an input facet and an output facet, wherein each facet has a partially reflective coating for at least one wavelength and one of a spherical polishing and a flat polishing, and the non-linear crystal has a periodically-poled active section and at least one non-poled side section located next to the input facet or the output facet,
   and means for controlling the temperature of the active section and the at least one side section, independently.

2. A monolithic resonator based apparatus according to claim 1 wherein the non-linear crystal comprises two non-poled side sections and wherein the means for controlling the temperatures are capable of independently controlling the temperatures of the active section and the two side sections independently.

3. A monolithic resonator based apparatus according to claim 1 wherein the means for controlling the temperature are thin layer resistors made of a conductor deposited on a support in contact with the non-linear crystal.

4. A monolithic resonator based apparatus according to claim 1 further comprising means for changing a pressure

| Number of degrees of freedom | Driving methods | Controls for 3-section | Controls for 2-section | Advantage over prior art |
| --- | --- | --- | --- | --- |
| 4 (phase matching, 2 cavity resonances, relative phase) | doubly resonant SHG doubly resonant degenerate PDC (Type I) | $T_C$, $T_L$, $T_R$ and elastooptic effect or wavelength tuning | not possible | increased efficiency and possible wavelength tunability (if wavelength not used as a control) |
| 3 (phase matching, 2 cavity resonances) | doubly resonant nondegenerate PDC or SFG (Type I or II) | $T_C$, $T_L$ and $T_R$ | $T_C$, $T_S$ and elastooptic effect or wavelength tuning | increased efficiency and possible wavelength tunability (if wavelength not used as a control) |
| 2 (phase matching, 1 cavity resonance) | singly resonant SHG or SFG singly resonant degenerate PDC (Type I) singly resonant nondegenerate PDC (Type I or II) | $T_C$, $T_L$ and/or $T_R$ | $T_C$ and $T_S$ | wavelength tunability |

As it is used herein, the term "comprises" and derivations thereof (such as "comprising", etc.) should not be understood in an excluding sense, that is, these terms should not be interpreted as excluding the possibility that what is described and defined may include further elements, steps, etc.

applied to the non-linear crystal, as a degree of freedom additional to temperatures of all the sections of the crystal used to fulfill the multiple resonance conditions of the cavity independently of the temperature of the active section.

5. A driving method for a monolithic resonator based apparatus according to claim 1 wherein phase matching is maintained by controlling the temperature (T°) of the active section of the non-linear crystal and cavity resonances are maintained by controlling the temperature of the at least one side section ($T_L$, $T_R$) of the crystal.

6. A use of the monolithic resonator based apparatus according to claim 1 as a multiple resonance parametric down-conversion device, a sum frequency generation device or a second harmonic generation device.

* * * * *